United States Patent
Kikuchi

(10) Patent No.: US 7,681,071 B2
(45) Date of Patent: Mar. 16, 2010

(54) STORAGE APPARATUS, CONTROL METHOD THEREFOR AND PROGRAM

(75) Inventor: Nobuyuki Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 11/317,000

(22) Filed: Dec. 27, 2005

(65) Prior Publication Data

US 2006/0215297 A1    Sep. 28, 2006

(30) Foreign Application Priority Data

Mar. 24, 2005    (JP) .............................. 2005-086509

(51) Int. Cl.
*G06F 11/00*    (2006.01)

(52) U.S. Cl. ......................................................... 714/6

(58) Field of Classification Search ..................... 714/6, 714/752–757, 763–767
See application file for complete search history.

(56) References Cited

U.S. PATENT DOCUMENTS

| | | | | |
|---|---|---|---|---|
| 5,632,012 A * | 5/1997 | Belsan et al. | ................... | 714/6 |
| 5,684,944 A * | 11/1997 | Lubbers et al. | ................. | 714/6 |
| 5,822,513 A * | 10/1998 | Ofer et al. | ....................... | 714/42 |
| 5,844,919 A * | 12/1998 | Glover et al. | ................ | 714/769 |
| 5,872,800 A * | 2/1999 | Glover et al. | ................ | 714/766 |
| 5,909,334 A * | 6/1999 | Barr et al. | ...................... | 360/53 |
| 5,974,574 A * | 10/1999 | Lennie et al. | ................. | 714/52 |
| 6,289,484 B1 * | 9/2001 | Rothberg et al. | ............. | 714/769 |
| 6,412,083 B1 * | 6/2002 | Rothberg et al. | .............. | 714/42 |
| 6,412,089 B1 * | 6/2002 | Lenny et al. | ................. | 714/769 |
| 6,484,269 B1 * | 11/2002 | Kopylovitz | ..................... | 714/5 |
| 6,516,380 B2 * | 2/2003 | Kenchammana-Hoskote et al. | .............................. | 711/3 |
| 6,523,087 B2 * | 2/2003 | Busser | ........................ | 711/114 |
| 6,578,161 B1 * | 6/2003 | Kohtani et al. | ................ | 714/52 |
| 6,772,289 B1 * | 8/2004 | Corrigan | ...................... | 711/118 |
| 2002/0161970 A1 * | 10/2002 | Busser | ........................ | 711/114 |
| 2002/0162075 A1 * | 10/2002 | Talagala et al. | ............. | 714/819 |
| 2002/0162076 A1 * | 10/2002 | Talagala et al. | ............. | 714/819 |
| 2002/0169996 A1 * | 11/2002 | King et al. | ..................... | 714/8 |
| 2004/0168103 A1 * | 8/2004 | Biskup et al. | ................. | 714/8 |
| 2005/0160329 A1 * | 7/2005 | Briggs et al. | .................. | 714/54 |
| 2006/0136777 A1 * | 6/2006 | Terashita et al. | ................ | 714/6 |
| 2007/0050670 A1 * | 3/2007 | Shigemura et al. | ............. | 714/7 |
| 2008/0016413 A1 * | 1/2008 | Hetzler et al. | ................. | 714/52 |
| 2008/0307160 A1 * | 12/2008 | Humlicek | .................... | 711/113 |

FOREIGN PATENT DOCUMENTS

| | | |
|---|---|---|
| JP | 05-166304 | 7/1993 |
| JP | 2000-322850 | 11/2000 |
| JP | 2003-330629 | 11/2003 |

OTHER PUBLICATIONS

Japanese Office Action mailed on Apr. 7, 2009 in corresponding Japanese Application 2005-086509 (1page) (1 page English Translation).

* cited by examiner

*Primary Examiner*—Bryce P Bonzo
(74) *Attorney, Agent, or Firm*—Staas & Halsey LLP

(57) ABSTRACT

A magnetic disk array apparatus has a function of positively verifying read data with a configuration by which overhead can be reduced as much as possible. Upon writing data to each magnetic disk 10-I, verification, such as CRC data, is additionally written for each writing block, and also, in a disk array controller 20, the same CRC data is held (see FIG. 2).

10 Claims, 7 Drawing Sheets storage apparatus, control method therefor and program

CROSS-REFERENCE TO RELATED APPLICATIONS

This application claims the benefit of Japanese Application No. 2005-086509, filed Mar. 24, 2005, in the Japan Patent Office, the disclosure of which is incorporated herein by reference.

BACKGROUND OF THE INVENTION

1. Field of the Invention

The present invention relates to a storage apparatus, a control method therefor and a program, and in particular, to a storage apparatus, a control method therefor and a program configured for integratively managing storage areas of many storage apparatuses.

2. Description of the Related Art

As a storage apparatus, there is a so-called magnetic disk array apparatus configured to integratively handle respective storage areas of a plurality of magnetic disk apparatuses as a single logical volume.

In such a storage apparatus, when writing processing for the relevant magnetic disk, i.e., data updating processing, is not carried out properly due to a failure or such of the particular magnetic disk apparatus, old data, existing before the updating, is read upon data reading therefrom. In such a case, it may not be possible to determine that the thus-read data is actually erroneous data, existing before the updating. In this case, the old data is transmitted to a host apparatus. As a result, the host apparatus receives the old data before the updating, and as a result, a serious problem may occur, such as that the latest data is lost, for some cases.

Generally speaking, in a magnetic disk apparatus, a writing head is positioned at an address which is a writing target on a disk recording medium; after that, a writing current is provided thereto; and thus a magnetization direction on the disk recording medium is controlled, so that data writing is achieved. However, there may be a case where trouble occurs in a writing circuit, or when a sufficient output cannot be obtained from the writing head. In such a case, even when a control part of the magnetic disk apparatus carries out proper writing operations, the magnetization direction on the disk recording medium may not be changed sufficiently, so that data before the writing (old data) may still remain.

If as a result, the old data is read from the magnetic disk as mentioned above, a problem in the contents of the read data may not be recognized at all. In such a case, the control part of the magnetic disk array apparatus cannot detect the data problem even though the old data is read.

Conventionally, for the problem, generally the following two methods are applied to prevent reading of old data or detecting such a problematic situation.

1) Write check is carried out by the control part of the disk array apparatus.

For carrying out this processing, the following two methods may be applied:

(a) Upon data writing, data reading is also carried out, and a data comparison is made therebetween.

(b) Write patrol is carried out, which is described next.

Typically, the above-mentioned reading of old data occurs due to a failure or such in the magnetic disk apparatus. Therefore, the control part of the magnetic disk array apparatus carries out a write patrol at regular intervals for each magnetic disk apparatus, so as to detect such possible trouble(s). That is, when an error is detected during the write patrol, it is determined that a problem occurs in the corresponding magnetic disk apparatus, and data stored in the magnetic disk apparatus can be invalidated.

Typically, the write patrol comprises the following three steps:

(i) data is written in a special patrol area of the magnetic disk apparatus;

(ii) the thus-written data is read out; and (iii) the written data and the read data thus obtained are compared.

When disagreement in the data is detected as a result of step (iii), it is determined that an error has occurred. Write patrol is carried out for each magnetic disk apparatus for which the corresponding storage area is integratively managed by the magnetic disk array apparatus.

2) The above-described two conventional methods may be applied as follows:

(a) In response to a writing instruction from the control part of the magnetic disk array apparatus, each magnetic disk apparatus automatically carries out data writing/data reading/data comparison. Then, when data error is detected, an error message is responded to the above-mentioned writing instruction. The control part of the magnetic disk array apparatus detects from this error message that writing error has occurred in the corresponding magnetic disk apparatus.

(b) Each magnetic disk apparatus itself carries out write patrol automatically. Then, when an error is detected therefrom, data reading is invalidated after that detection.

Japanese Laid-open Patent Application No. 5-166304 discusses carrying out a comparison between written data and read data as described above for item 1) (a), in which in response to a writing instruction from the control part of the magnetic disk array apparatus (each time data is written), each magnetic disk apparatus automatically carries out data writing, data reading, and data comparison based upon CRC data written in a register. However, when carrying out a comparison between written data and read data as described above for the item 1) (a) or 2) (a), in addition to the time required for transferring write data from the host apparatus to the magnetic disk array apparatus, time is required for processing read data having the same contents. As a result, processing time required for each data writing operation increases, overhead increases, and thus system performance may be degraded accordingly.

Further, when carrying out write patrol mentioned above for the item 1) (b) or 2) (b), data integrity may not be assured in the interval between a patrol and a subsequent patrol.

Japanese Laid-open Patent Application No. 2002-322850 discusses providing a head/disk tester having a closed loop positioning system for correcting a thermal drift generated in positioning a magnetic head to a magnetic disc.

SUMMARY OF THE INVENTION

The present invention has been devised generally in consideration of the above-mentioned problems and other problems that may be learned, and according to an aspect of the present invention, a configuration is provided in which reading of old data as mentioned above can be positively detected, without degrading performance of the overall system, while eliminating or substantially reducing the interval during which data integrity cannot be assured, and system reliability can be improved regarding possible trouble in each magnetic disk apparatus, by providing in the magnetic disk array apparatus a redundancy configuration for the purpose of achieving verification of data read from the magnetic disk apparatus.

Additional aspects and advantages of the invention will be set forth in part in the description which follows and, in part, will be obvious from the description, or may be learned by practice of the invention.

According to an aspect of the invention, a method of controlling a storage array apparatus that integratively manages storage areas of a plurality of storage apparatuses, comprises additionally writing predetermined verification data for a writing unit upon writing data to each of the plurality of storage apparatuses, and also storing the verification data in a control part which is provided to integratively control the plurality of storage apparatuses.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
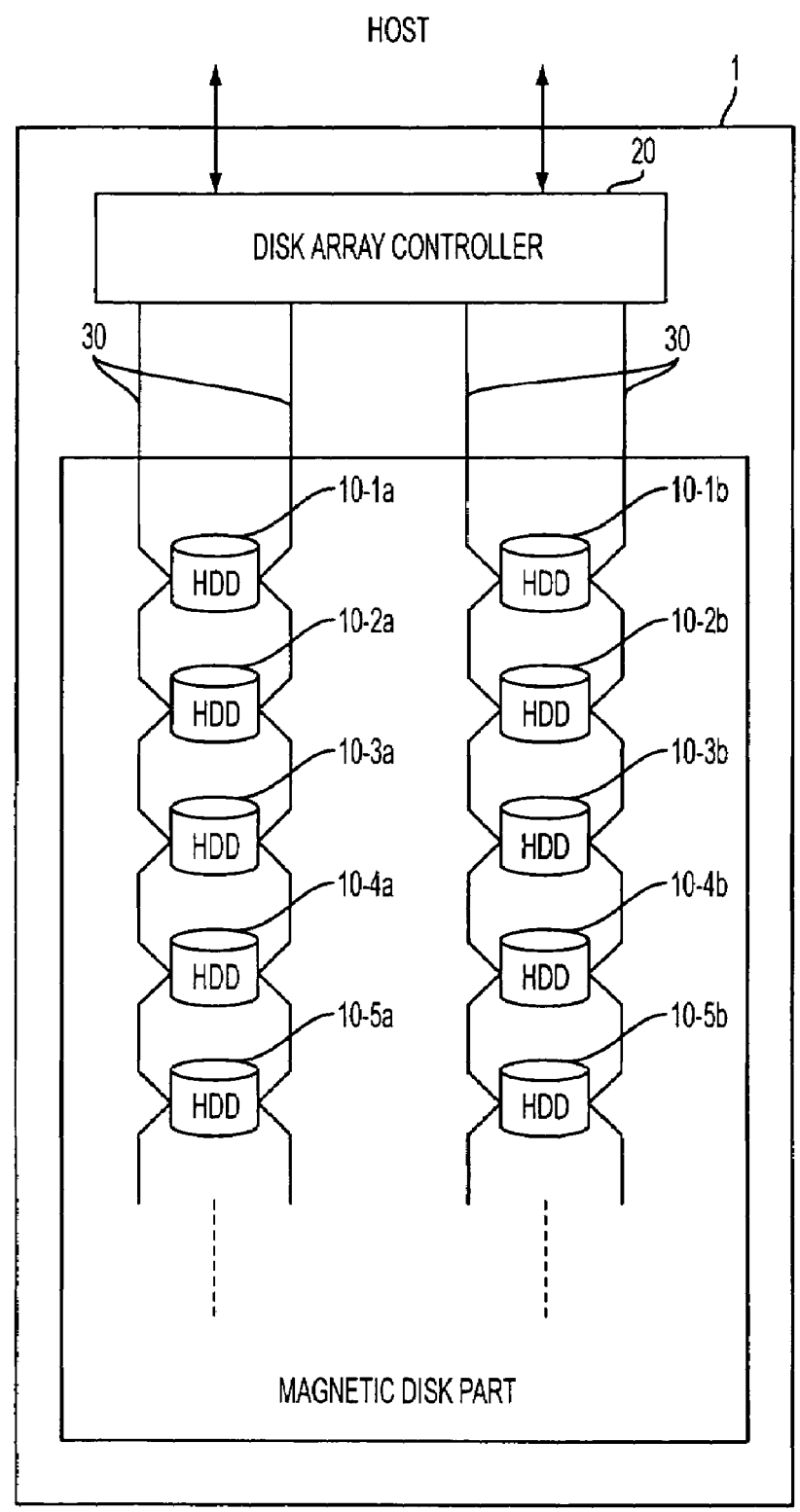
FIG. 1 is a block diagram showing a general configuration of a magnetic disk array apparatus, according to one embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

According to an aspect of the present invention, to solve the above-mentioned problems and other problems, a predetermined verification data is additionally written for each writing unit upon writing of data in the corresponding storage apparatus of a plurality of storage apparatuses, and the same verification data is also stored in a control part of a storage array apparatus which integratively manages storage areas of the plurality of storage apparatuses. In other words, verification data is written both in a storage apparatus with the user data at a time of writing the user data in the storage apparatus and in a control part of the storage apparatus, thus providing redundant or mirrored (real-time copied) verification data writing.

By additionally writing verification data upon writing user data in the storage apparatus, and also by managing the same verification data in the control part that is integratively managing the storage areas of the plurality of the storage apparatuses, it is possible to positively verify read user data by comparing both the verification data that has been additionally written with the user data in the storage apparatus with the verification data managed in the control part of the storage apparatus, upon reading the user data.

By the present invention, since verification of read data can be achieved from or based upon data comparison with the verification data at a data reading occasion (verification when data is read), it is not necessary to carry out data verifying operations for data written each time of data writing. Therefore, it is possible to effectively reduce the overhead required to write data and verify the written data at same time. Further, since data verification is carried out for a data reading occasion, it is possible to avoid loss of data integrity during an interval between successive write patrol operations otherwise occurring when only write patrol is applied for data verification.

According to an embodiment of the present invention, a configuration for effectively carrying out disk writing error detection can be achieved, for example, in a Redundant Array of Independent (or Inexpensive) Disks (RAID) sub-system. In the embodiment of the present invention, in a magnetic disk array apparatus included in a so-called RAID sub-system, a function is provided for adding a check code for each writing block for each magnetic disk belonging to the magnetic disk array apparatus. Further, according to the present invention, the check code thus added is also stored in a control part (corresponding to a disk array controller 20 in FIG. 1) inside of the magnetic disk array apparatus, at the same time. Then, upon data reading from a magnetic disk apparatus, data comparison is carried out between the check code additionally written to write data as mentioned above and the check code also stored in the control part of the disk apparatus.

More particularly, in a conventional magnetic disk array apparatus, a check code is added for a block unit of data to be written for the purpose of improving user data reliability (integrity). Typically, the check code is a cyclic redundancy code (or a CRC code, and simply referred to as CRC data, hereinafter) applying a logical address of a data block as a seed. By applying such a configuration of a check code, it is possible to not only verify the contents of written data but also verify that data is read from the correct address. For example, Japanese Laid-open Patent Application No. 5-166304 discloses a method of adding such a CRC data.

Typically, the CRC data is added when user data is divided into block units in the control part of the magnetic disk array apparatus when the magnetic disk array apparatus receives the user data from the host apparatus. Then the data blocks of user data having the CRC data thus added thereto are written in a disk recording medium (hard disk or such) in the magnetic disk array apparatus.

Then, when the data thus written in the magnetic disk apparatus is read, the control part of the magnetic disk array apparatus recalculates the CRC data based on the data read from the magnetic disk apparatus. The thus-recalculated CRC data is compared with the CRC data additionally written in the magnetic disk apparatus together with the data as mentioned above. Then, when the comparison result is that they are the same, it is determined that the data has an expected value, and thus, is correct. On the other hand, when they are not the same, it is determined that the read data is different from the expected value, and thus, the data is then invalidated.

According to an aspect of the present invention, the CRC data is not only written in the disk recording medium of the magnetic disk array apparatus, but also is stored in a memory (cache or such) of the control part of the magnetic disk array apparatus, thus, providing CRC data redundancy or mirroring. As a result, in addition to a comparison between the CRC data recalculated from the read data and the CRC data directly read from the magnetic disk apparatus, comparison with the CRC data stored in the memory of the control part of the magnetic disk array apparatus is possible.

That is, for a case where, as mentioned above, writing results in a failure, for example, due to a trouble in the writing function in the magnetic disk apparatus or such, and as a result, old data remains without being updated, CRC data recalculated from the old data may agree with CRC data directly read from the magnetic disk apparatus. In such a case, the writing failure may not be detected. This is because, when writing results in a failure as mentioned above when user data is written together with CRC data, both the user data and the CRC data are not updated, and thus both are left in the old state.

In contrast thereto, according to the present invention, CRC data is held in the memory of the control part of the magnetic disk array apparatus as mentioned above. CRC data thus held in the memory of the control part of the magnetic disk array apparatus is not influenced even when a writing failure occurs on the side of the magnetic disk apparatus as mentioned above. Therefore, in the memory of the control part of the magnetic disk array apparatus, CRC data concerning relevant updating is positively stored.

According to an aspect of the present invention, the relevant CRC data stored in the memory of the control part of the magnetic disk array apparatus does not agree with the CRC data recalculated from the user data in the old state read from the magnetic disk apparatus, and/or also does not agree with the CRC data in the old state directly read from the magnetic disk apparatus either. As a result, data error caused by the writing failure can be positively detected.

Further, it is assumed, for example, that 8 bytes of CRC data is added to each block of 520 bytes for a disk recording medium having a storage capacity of 146 GB (see FIG. 6), and also, all of the CRC data is stored in the memory of the control part of the magnetic disk array apparatus. On this assumption, a CRC data storage area of approximately 2.2 GB is required for each magnetic disk apparatus of 146 GB.

Since a plurality of magnetic disk apparatuses belong to a magnetic disk array apparatus in general, the required storage capacity would become huge for storing CRC data for all the magnetic disk apparatuses on such an assumption. Accordingly, the magnetic disk array apparatus would become expensive, and would require an increased physical capacity.

In order to solve this and/or other problems that may be learned, in the embodiment of the present invention, in addition to the function of storing CRC data in the memory of the control part of the magnetic disk array apparatus, a function is provided to carry out write patrol at one or more time intervals (e.g., a regular time interval). Then, when the write patrol can be completed properly, it can be determined that writing carried out until then has been properly carried out, and thus all the CRC data stored until then in the control part of the magnetic disk array apparatus can be deleted (cleared). Then, for data writing operations carried out after the write patrol, processing is again started for storing CRC data concerning the data writing operations in the memory of the control part of the magnetic disk array apparatus.

Further, according to an aspect of the present invention, upon storing CRC data in the control part of the magnetic disk array apparatus, the entirety of the CRC data (8 bytes in the above-mentioned example) is not necessarily actually stored. Instead, merely a part or portion thereof can be stored. As a result, it is possible to avoid an increase in the amount of CRC data stored in the memory of the control part of the magnetic disk array apparatus, and thus, it is still possible to positively avoid reading old data in case of a data write failure.

Further, according to the embodiment of the present invention, compared to operations of comparing write data and read data for each occasion of data writing as in the related art, it is possible to positively reduce the overhead of the processing. As a result, it is possible to control the influence of the relevant read data verification function on the entire system.

The embodiment of the present invention is described next in detail with reference to figures. FIG. 1 is a block diagram of a general configuration of the magnetic disk array apparatus 1, according to an embodiment of the present invention. As shown, the magnetic disk array apparatus 1 includes a disk array controller 20 connected to the host apparatus via a host interface (I/F); and a magnetic disk part including a plurality of magnetic disk apparatuses (hard disk devices) 10-1$a$, 10-2$a$, 10-3$a$, ..., 10-1$b$, 10-2$b$, 10-3$b$, ... (for the reference numeral of each of which magnetic disk apparatuses, 10-$i$ may be applied, hereinafter) for which respective storage areas are integratively managed by the disk array controller 20. The disk array controller 20 and the magnetic disk part are connected by a disk access interface (I/F) 30.

In this magnetic disk array apparatus 1, storage areas of corresponding disk recording media (hard disks) of the plurality of magnetic disk apparatuses 10-1$a$, 10-2$a$, 10-3$a$, ..., 10-1$b$, 10-2$b$, 10-3$b$, ... are integratively managed as a single logical volume. Then, for this logical volume, user data is written according to a writing instruction from the host apparatus, or the same is read therefrom according to a reading instruction and is transmitted to the host apparatus.

Figure 2:
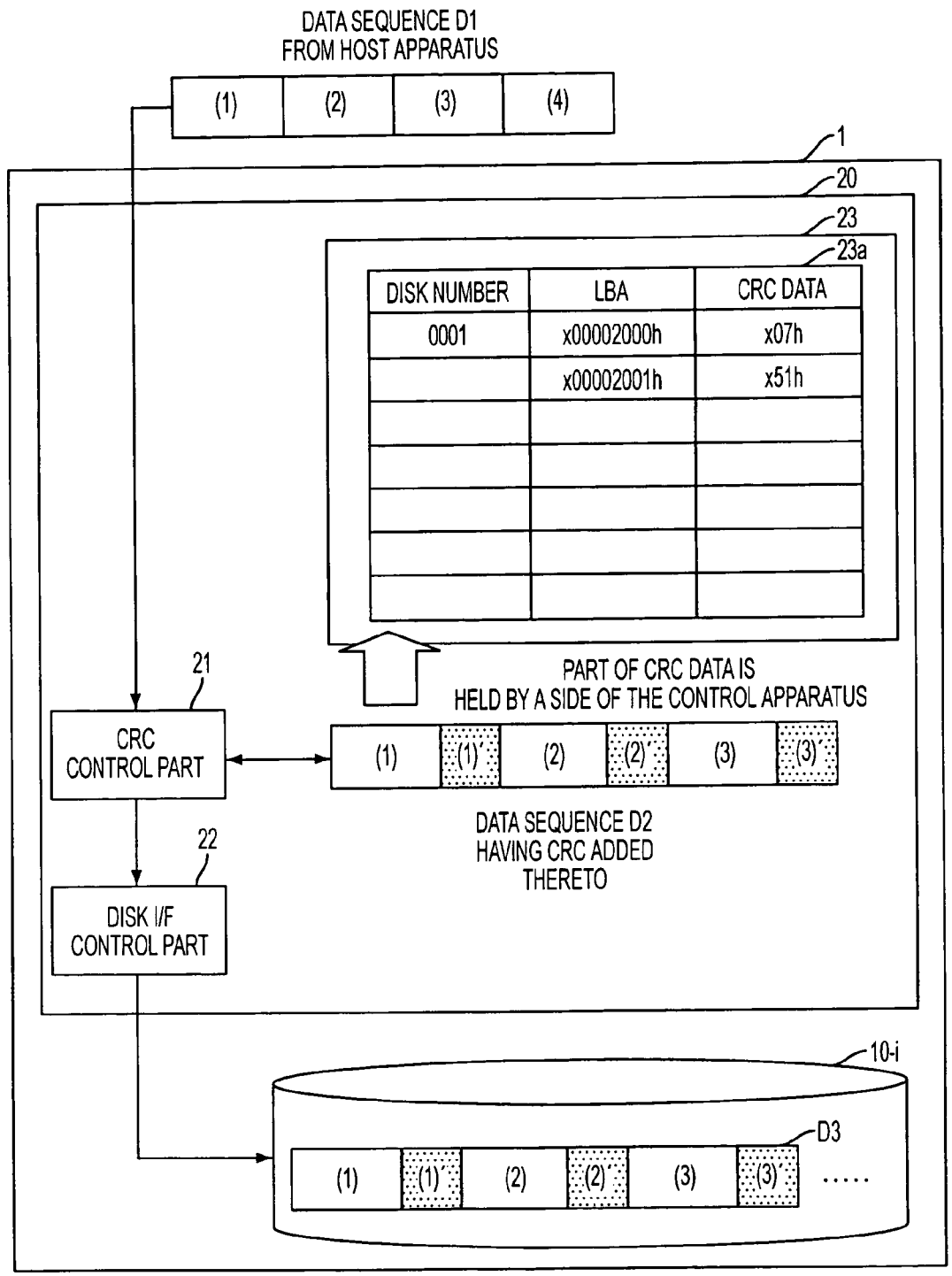
FIG. 2 is a functional block diagram illustrating a CRC generation and adding function of a disk array controller shown in FIG. 1, according to an embodiment of the present invention.
Figure 3:
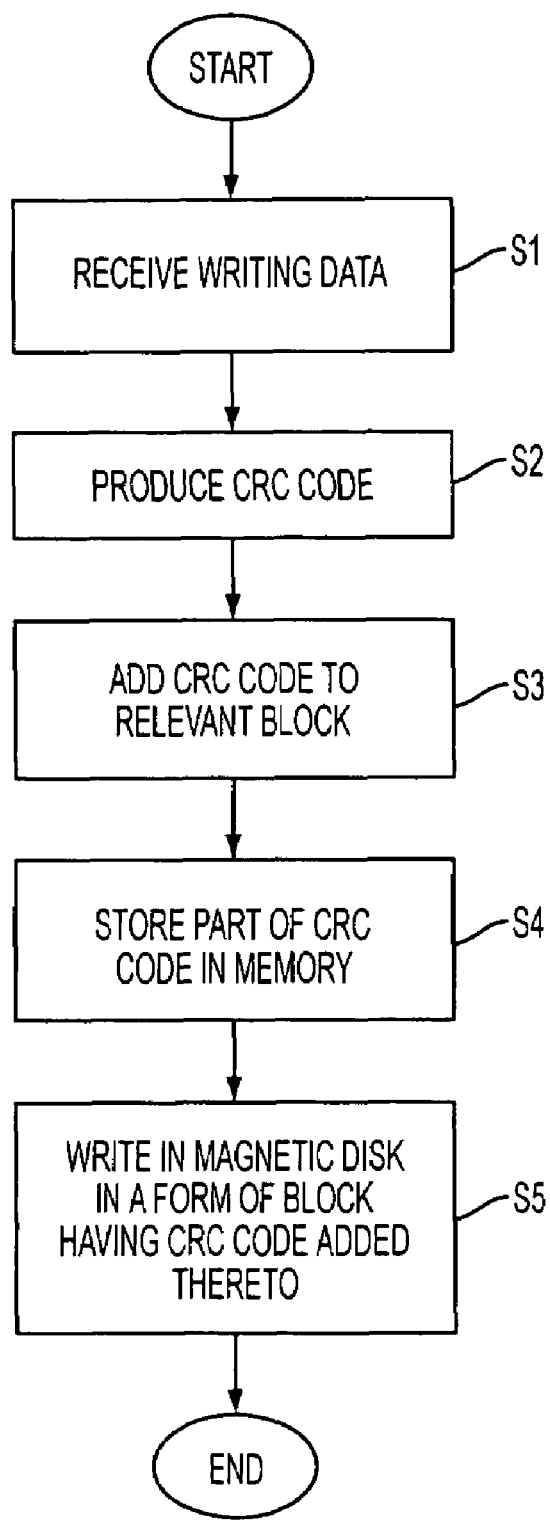
FIG. 3 is an operations flowchart for when data is written in a magnetic disk apparatus, by a disk array controller shown in FIG. 2, according to an embodiment of the present invention.

FIG. 2 is a functional block diagram of an internal configuration of a disk array controller of the magnetic disk array apparatus shown in FIG. 1 to carry out the read data verification function applying CRC data, according to an embodiment of the present invention. FIG. 3 shows an operations flowchart of user data writing operations carried out by the disk array controller 20, according to an embodiment of the present invention. As shown in FIG. 2, the disk array controller 20 determines according to predetermined processing the magnetic disk apparatus 10-$i$ to which relevant user data D1 is written, for the user data D1 transferred from the host apparatus along with a writing instruction, and also determines a logical block address (LBA) at which the user data is written. Then a CRC control part 21 calculates CRC data with such a method as described above (Steps S1 and S2). That is, for each block unit (for example, 512 bytes, that is, (1), (2), (3), ... in FIG. 2) of the user data, CRC data ((1)', (2)', (3)', ...) are generated, respectively. Then, the thus-generated CRC data is added respectively to each block unit of the user data (data D2), and then, in this state, as data D3, the user data is written at the above-mentioned LBAs in the disk recording medium of the corresponding magnetic disk apparatus 10-$i$ (Steps S3 and S5).

At this time, for example, only a part (for example, 1 byte) of the CRC data (for example, 8 bytes) generated in Step S2 is stored in a previously provided CRC data storage area 23$a$ in a cache memory 23 of the disk array controller 20 (Step S4). At this time, the CRC data is stored in a condition of having a corresponding relationship with a disk number denoting the individual number of the relevant disk apparatus 10-$i$ and the relevant block address LBA (see FIG. 2).

Figure 4:
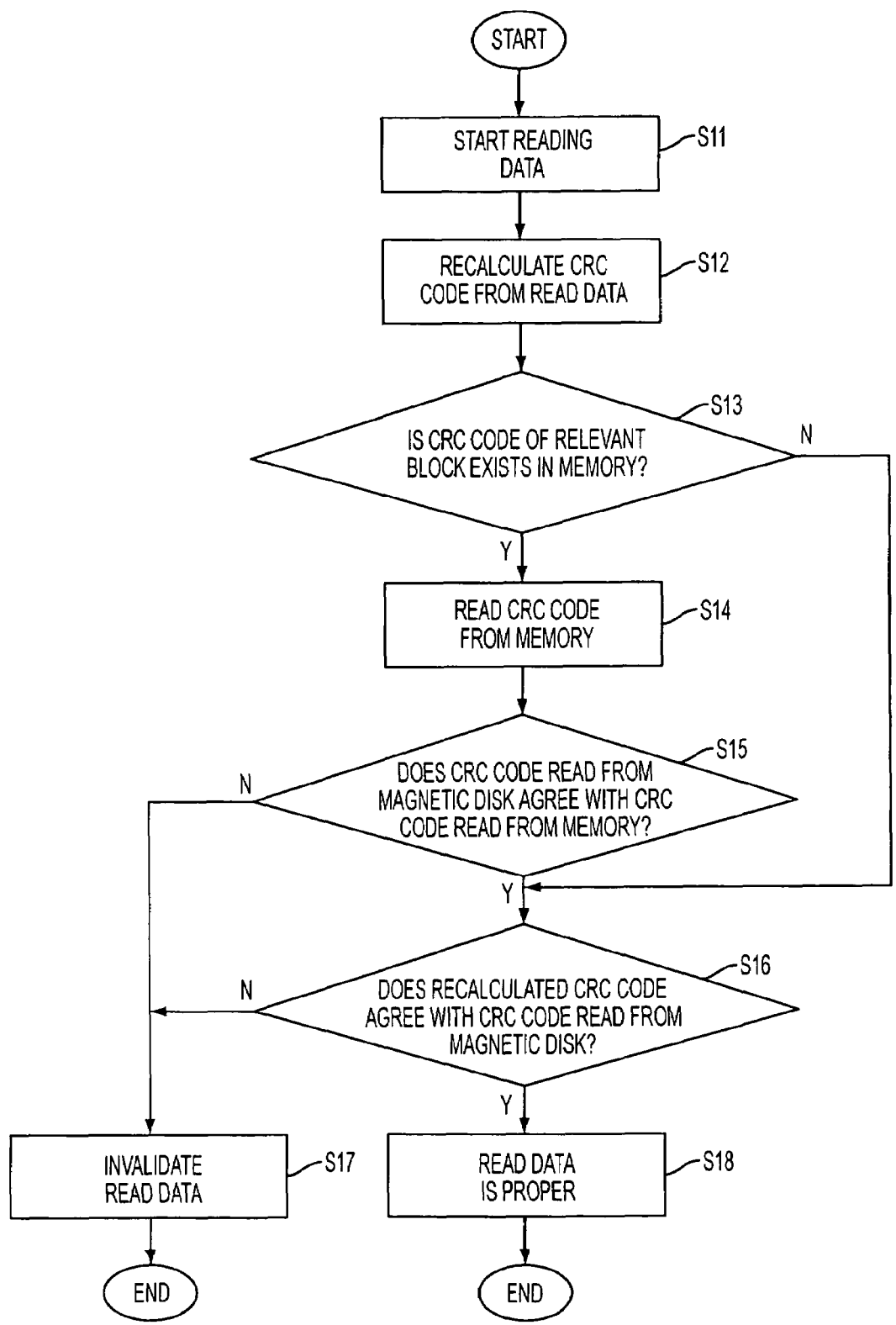
FIG. 4 is an operations flowchart for when data is read from a magnetic disk apparatus, by the disk array controller shown in FIG. 2, according to an embodiment of the present invention.

FIG. 4 shows an operations flowchart of user data reading operation carried out by the disk array controller 20, according to an embodiment of the present invention. When user data is read out from the magnetic disk apparatus 10-$i$ in response to a reading instruction from the host apparatus, the CRC control part 21 of the disk array controller 20 recalculates CRC data of the relevant user data for each block read from the relevant magnetic disk apparatus 10-$i$ (Steps S11, S12). Next, CRC data having the corresponding relationship with the relevant LBA is read from the CRC data storage area 23$a$ (Steps S13, S14). Then, at step S15, data comparison is carried out between the thus-read CRC data from the CRC data storage area 23$a$ and CRC data ((1)', (2)', (3)', ...) written additionally together with the relevant user data as mentioned above and read out together with the relevant user data ((1), (2), (3), ... ) in Step S12.

From this operation, even if old data before being updated is read out, this matter is detected, and thus it is possible to positively prevent the old data thus read out from being transmitted to the host apparatus. That is, as described above, even if old data (old user data+old CRC data) is actually kept un-updated for a corresponding LBA due to a trouble occurring upon writing of the relevant data, and then, is read out, CRC data stored in the CRC data storage area 23$a$ with the corresponding relationship with the corresponding LBA is for properly updated data. As a result, in such a case, the comparison between both CRC data sets should positively result in a disagreement (not the same), and thus the data error can be positively detected. As a result, it is possible to provide only read data having no data error to the host apparatus.

According to an aspect of the present invention, in Step S13 it can be determined whether relevant CRC data is stored in the CRC data storage area 23$a$. When it is determined therefrom that no relevant CRC data is found (No in S13), it is not possible to carry out read data verification operations (Step S15) with CRC data which should have been stored in the CRC data storage area 23$a$ when the relevant user data is written in the magnetic disk apparatus 10-$i$. Accordingly, Steps S14 and S15 are skipped in this case, and then, Step S16 is executed directly.

When it is determined from the comparison of Step S15 that both CRC data sets agree with one another (Yes in Step S15), data comparison is carried out (Step S16) between the CRC data recalculated from the user data read from the magnetic disk apparatus 10-$i$ in Step S12 and the CRC data ((1)', (2)', (3)', ...) written additionally together with the relevant user data as mentioned above and read out together with the relevant user data ((1), (2), (3), ... ) in Step S12. From operation 16, it is possible to determine whether damage or such exists in the user data written in the disk recording medium of the magnetic disk apparatus 10-$i$. When data error is found, proper processing can be carried out therefor at this stage. Accordingly, it is possible to provide read data without data error to the host apparatus. When it is determined in Step S16 that both CRC data sets agree with one another (Yes in S16), it is determined in Step S18 that the user data read in Step S12 is proper data. On the other hand, when it is determined in Step S15 that both CRC data sets do not agree (No in S15), or when it is determined in Step S16 that both CRC data sets do not agree (No in S16), it is determined that the read data is not proper data, and proper processing is carried out, such as to invalidate the relevant read data (Step S17).

Figure 6:
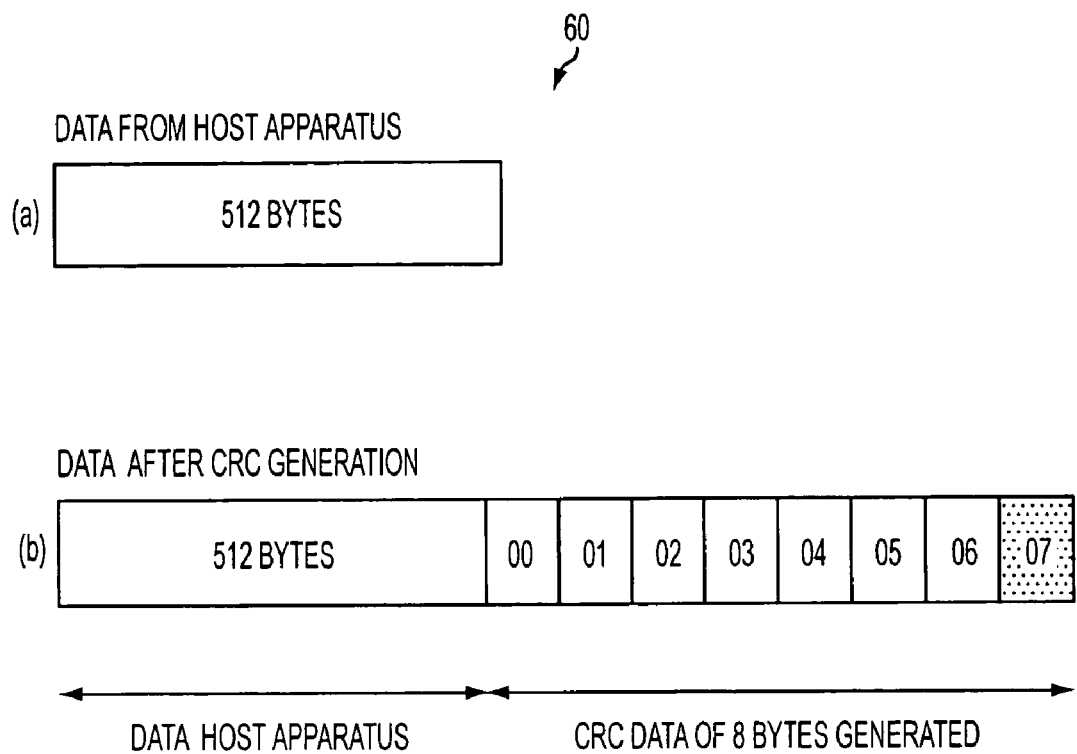
FIG. 6 illustrates a configuration of storage of CRC data generated by the disk array controller shown in FIG. 2, according to an embodiment of the present invention.

Next, storage of CRC data in the CRC data storage area 23$a$ is described. In the present embodiment, a block length of user data transferred from the host apparatus is assumed, for example, as 512 bytes, and therefrom, CRC data of, for example, 8 bytes is generated by the CRC control part 21. FIG. 6 illustrates a data structure or format configuration 60 of storage of CRC data generated by the disk array controller 20 shown in FIG. 2, according to an embodiment of the present invention. Specifically, for a block of user data as shown in FIG. 6 ($a$), CRC data of 8 bytes shown in FIG. 6, ($b$) is generated. In the present embodiment, not all the 8 bytes of CRC data have to be stored in the CRC data storage area 23$a$, but, for example, the 8th byte (x07$h$) is extracted therefrom, and is stored in the CRC data storage area 23$a$.

Further, in the present embodiment, as mentioned above, write patrol can be carried out at regular intervals (described later), and when no problem is detected, the contents of the relevant CRC storage area 23$a$ can be cleared (deleted). From such processing, it is possible to avoid an increase in the data amount in the CRC storage area 23$a$. The write patrol operation is described next.

According to an aspect of the present invention, the disk array controller 20 carries out write patrol at regular intervals on all the disk apparatuses 10-1$a$, 10-2$a$, 10-3$a$, ..., 10-1$b$, 10-2$b$, 10-3$b$, ..., included in the magnetic disk part which belongs to the disk array controller 20. Typically, in this write patrol, the following items (1) through (4) of processing is carried out, and it is determined whether data writing has been properly carried out for each magnetic disk apparatus 10-$i$.

(1) Typically, the disk array controller 20 can previously provide a system area to be applied for execution of the write patrol in a storage area of each magnetic disk apparatus 10-$i$. This system area is provided separately from an area applied to store user data, and is not shared therefor. Further, this system area includes areas subject to data writing by all the writing heads included in each magnetic disk apparatus 10-$i$. This is because performance of each of the writing heads should be verified in the write patrol.

(2) Upon an actual write patrol, predetermined dummy data is written in this system area, and then the written data is read out. After that, it is determined whether disagreement exists between the written data and the read data.

(3) At this time, access processing from the host apparatus is not allowed during the data writing and data reading in the write patrol.

(4) Then, for the magnetic disk apparatus 10-$i$ for which no problem is found in the write patrol, it can be determined that the data written there until then is proper data, and the data in the CRC storage area 23$a$ can be deleted (cleared) for the relevant magnetic disk apparatus 10-$i$.

By carrying out the write patrol at regular intervals, it is possible to avoid an increase in the required data size of the CRC storage area 23$a$, and also it is possible to verify that written data in the user area is proper data, at the same time. That is, when verification of written data is carried out in the write patrol, the data writing performance of each writing head of the corresponding magnetic disk apparatus is verified as having no problem. Accordingly, it can be determined that all the user data written until then in the corresponding magnetic disk apparatus is data which has been properly written.

Figure 5:
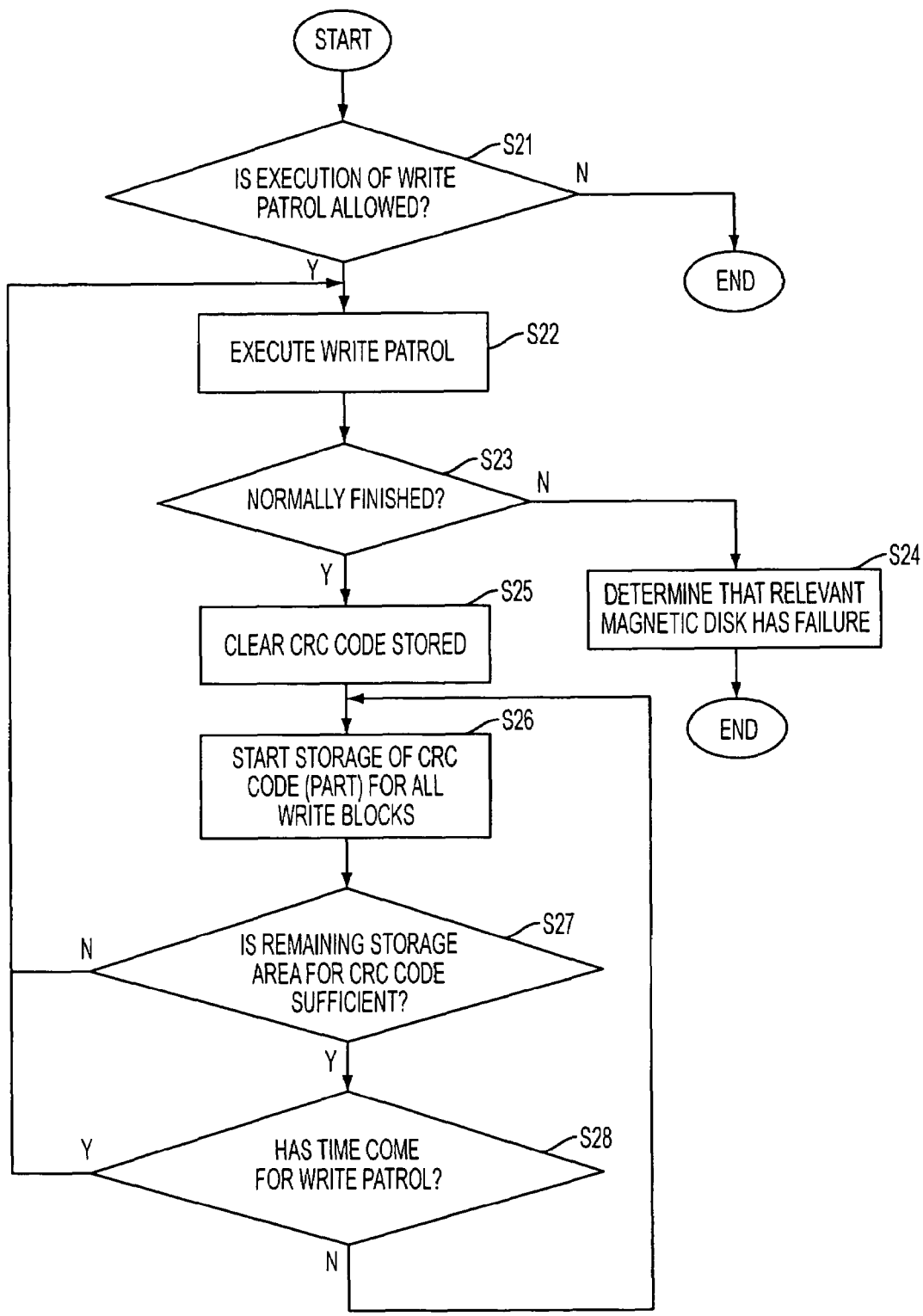
FIG. 5 is an operations flowchart of write patrol operations by the disk array controller shown in FIG. 2, according to an embodiment of the present invention.

FIG. 5 shows an operations flowchart of the write patrol operation by the disk array controller 20, according to an embodiment of the present invention. In FIG. 5, in Step S21, it is determined from predetermined set requirements in the disk array controller 20 whether the write patrol operation is allowed. When it is allowed (Yes), the write patrol operation is carried out in Step S22, and in Step S23, it is determined whether the relevant write patrol has been properly finished.

When it has not been finished properly (No in S23), it is determined in Step S24 that the relevant magnetic disk apparatus 10-*i* has trouble. On the other hand, when the write patrol has been finished properly (Yes in S23), that is, when written data and read data in the system area agree with one another, at step S25, the data in the CRC storage area 23*a* is erased for the magnetic disk apparatus 10-*i*. Then, in Step S26, the operation of writing a part (x07*h*) of CRC data generated upon writing of user data transferred from the host apparatus in the CRC data storage area 23*a* according to the procedure described above with reference to FIG. 3 is started (repeated/continued).

Then, in Step S27, storage capacity still available for data writing in the CRC storage area 23*a* is measured. Then, when it is determined that sufficient capacity is not available as a result (No in S27), the operation returns to Step S22 and the write patrol is carried out again. On the other hand, when it is determined that sufficient capacity is available in the CRC storage area 23*a* in Step S27 (Yes), it is determined in Step S28 whether a time to carry out a subsequent write patrol is already reached, from a comparison between the time that has elapsed since the previous write patrol and a predetermined write patrol execution time interval. When the subsequent write patrol execution time has been reached, the operation returns to Step S22, and the write patrol is executed again.

Depending on the frequency of occurrence of writing instructions given from the host apparatus, the remaining capacity in the CRC storage area 23*a* may become small before the predetermined write patrol execution time interval has elapsed. Therefore, the remaining capacity is measured for the determination in Step S27, and when the remaining capacity is found to be small as a result of the determination, the write patrol is executed at that time (Step S22).

By so configuring, even when writing instructions are given by the host apparatus with a high frequency and as a result the remaining capacity in the CRC data storage area 23*c* becomes small before the elapse of the predetermined write patrol execution time interval, it is possible to avoid a problematic situation in which storage of CRC data is not allowed, and thus it is not possible to carry out verification of written data.

For example, assuming that the predetermined write patrol execution time interval is set as 3 seconds, the write patrol is executed every 3 seconds. Then, when the write patrol finishes normally (Yes in Step S23), all the data held by the CRC data storage area 23*a* is cleared for the relevant magnetic disk apparatus 10-*i*, and then storage of CRC data is started for blocks of user data written after that. Then, the remaining capacity in the CRC data storage area 23*a*, or an elapse of the write patrol execution time interval (3 seconds) is monitored (Steps S27, S28), and the write patrol is again executed as is necessary (Step S22). However, the present invention is not limited to a 3 seconds write patrol time interval, but the write patrol time interval or any performance verification or testing process of a storage apparatus (e.g., data writing performance verification) can be about 3 seconds or lower (for example as low as 100 ms or even lower). More particularly, according to an aspect of the present invention, the more efficient a writing verification operation of a storage apparatus can be performed, for example, the lower the write patrol time interval, the more optimal or efficient can the CRC data storage area 23*a* be managed to store CRC data for all the storage apparatuses.

Figure 7:
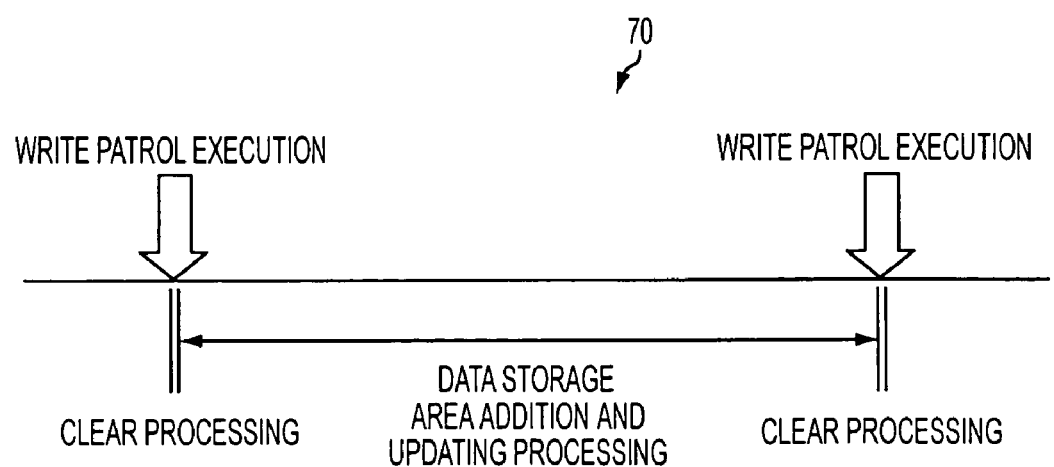
FIG. 7 is a time chart illustrating timing of CRC data clearing during write patrol operations executed by the disk array controller shown in FIG. 2, according to an embodiment of the present invention.

FIG. 7 shows a time chart 70 illustrating CRC data clearing processing timing during a write patrol operation executed by the disk array controller 20, according to an embodiment of the present invention. As shown, data stored in the CRC data storage area 23*a* is cleared at least for every write patrol operation executed at the write patrol execution time interval. Thereby, it is possible to effectively reduce the required capacity of the CRC data storage area 23*a*.

Figure 8:
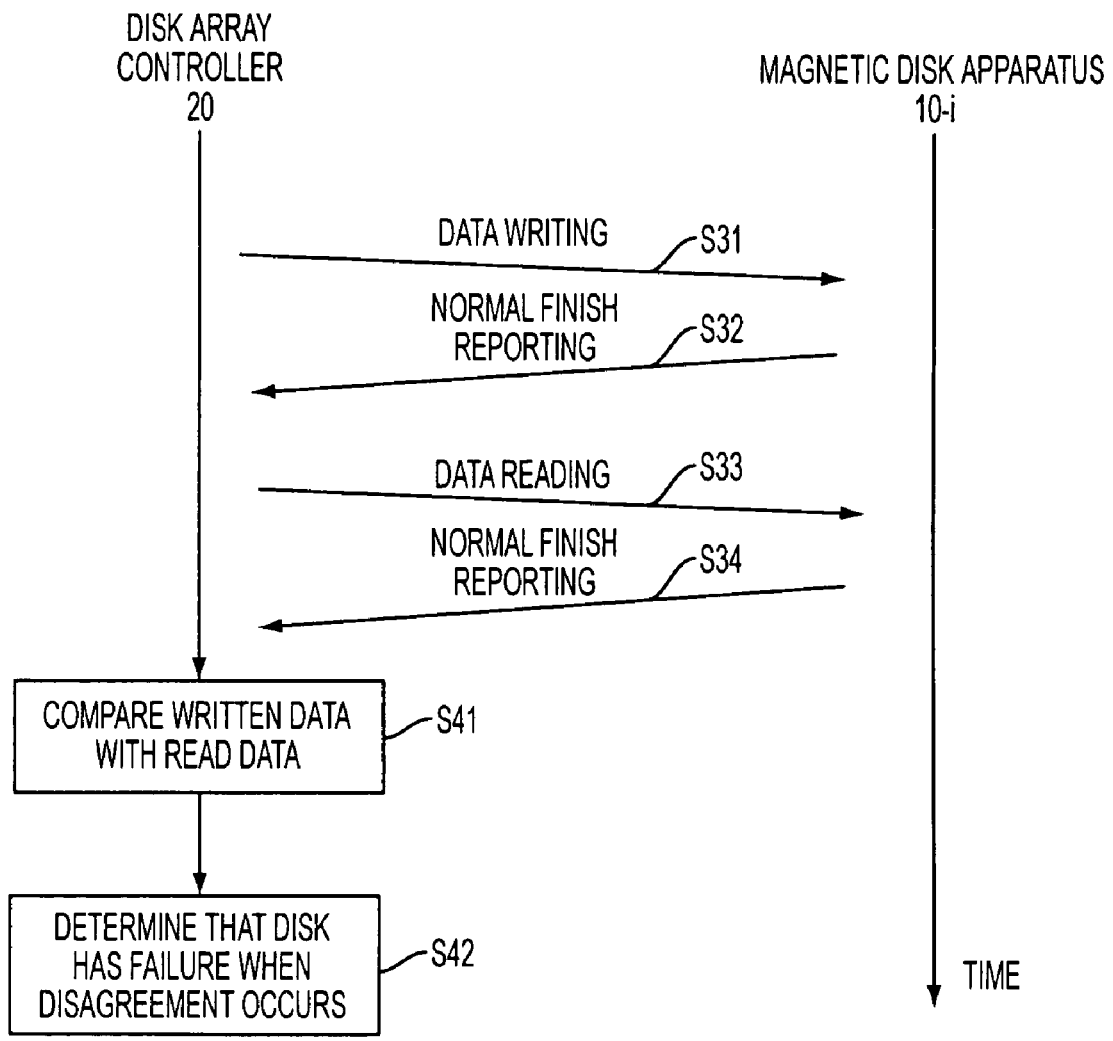
FIG. 8 is a sequence diagram illustrating an operation flow of the write patrol operations executed by the disk array controller shown in FIG. 2, according to an embodiment of the present invention.

FIG. 8 shows a sequence diagram illustrating flow of the write patrol operation executed by the disk array controller 20, according to an embodiment of the present invention. As shown, upon execution of the write patrol operation of Step S22 of FIG. 5, the disk array controller 20 sends an instruction to the magnetic disk apparatus 10-*i* in Step S31, such as to cause it to write dummy data in the system area provided in the disk recording medium of the relevant magnetic disk apparatus 10-*i*. In response to this instruction, in step S32, the relevant magnetic disk apparatus 10-*i* issues a report that processing of writing the dummy data has been properly finished. In response thereto, in step S33, the disk array controller 20 then sends another instruction to the magnetic disk apparatus 10-1, such as to cause it to read the dummy data thus written in the system area of the disk recording medium of the magnetic disk apparatus 10-*i*. In response thereto, the magnetic disk apparatus 10-*i* sends out a report that this processing has been properly finished, in Step S34. In response thereto, in step S41, the disk array controller 20 carries out data comparison between the dummy data given concerning the writing instruction in Step S31 and the dummy data received with the proper finish report of Step S34. Then, when both are not the same, in step S42, the disk array controller 20 determines that the relevant magnetic disk apparatus 10-*i* has a problem, and then carries out Step S24 of FIG. 5. On the other hand, when it is determined there that both are the same, Step S25 of FIG. 5 is then executed.

Typically, according to an aspect of the present invention, such a write patrol operation is carried out on all the system areas subject to writing by the respective writing heads of each particular magnetic disk apparatus 10-*i* included in the magnetic disk array apparatus 1, in sequence, at regular intervals. Further, such a write patrol operation on each magnetic disk apparatus 10-*i* is carried out in sequence at regular intervals on all the magnetic disk apparatuses 10-1*a*, 10-2*a*, 10-3*a*, . . . , 10-1*b*, 10-2*b*, 10-3*b*, . . . managed by the magnetic disk array apparatus 1.

A program including instructions for causing a computer to execute the operations described above with reference to FIGS. 3 through 8 may be produced, a CPU of the computer may be caused to read this program so as to execute the same, and thereby it is possible to achieve the functions of the CRC control part 21 of the disk array controller 20 shown in FIG. 20. The program may be recorded in a carriable recording medium, such as CD-ROM, for example, may be read out by means of a computer so that the same may be installed there, or the same program may be downloaded from an external server via a communication network, such as the Internet, a LAN or such so that the same may be installed in the computer; and after that, the computer is caused to execute the program. In other words, the herein described embodiments can be implemented in programmable computing hardware, hardware, or software, or any combinations thereof. The present invention relates to a storage apparatus used for or by a computing apparatus(es) or a computer(s) (a computer storage or a computer data storage device), a control method therefor and a program, and in particular, to a storage apparatus, a control method therefor and a program configured for integratively managing storage areas of many storage apparatuses.

The present invention may have a configuration described in each of the following items: 1) An apparatus configured to integratively manage storage areas of a plurality of storage apparatuses, comprising means for additionally writing predetermined verification data for each writing unit upon writing data to each of the plurality of storage apparatuses; and means for storing the verification data in a control part which is provided to integratively control the plurality of storage apparatuses. 2) The apparatus further comprises means for comparing the verification data, written additionally to the writing data in the relevant storage apparatus, and obtained when reading data from each storage apparatus from among the plurality of storage apparatuses, with verification data stored in the control part. 3) The apparatus further comprises means for carrying out at least at regular intervals writing verification operations on each storage apparatus of the plurality of storage apparatuses, and erasing data stored in the control part for the relevant storage apparatus when the verification result in success. According to an aspect of the invention, the verification data comprises CRC data.

5) A method of controlling an apparatus configured to integratively manage storage areas of a plurality of storage apparatuses, comprising additionally writing predetermined verification data for each writing unit upon writing data to the corresponding storage apparatus; and storing the verification data in a control part which is provided to integratively control the plurality of storage apparatuses. 6) The method further comprises comparing the verification data, written additionally to the writing data in the relevant storage apparatus, and obtained when reading data from each storage apparatus from among the plurality of storage apparatuses, with verification data stored in the control part. 7) The method further comprises carrying out at least at regular intervals writing verification operations on each storage apparatus of the plurality of storage apparatuses, and erasing data stored in the control part for the relevant storage apparatus when the verification result in success. According to an aspect of the invention, the verification data comprises CRC data.

9) A computer readable storage medium to store a program comprising instructions to control an apparatus (e.g., a computing device, a computer, a disk array apparatus) configured to integratively manage storage areas of a plurality of storage apparatuses, comprising means for additionally writing predetermined verification data for each writing unit upon writing data to each of the plurality of storage apparatuses; and means for storing the verification data in a control part which is provided to integratively control the plurality of storage apparatuses. 10) The program further comprises instructions to compare the verification data, written additionally to the writing data in the relevant storage apparatus, and obtained when reading data from each storage apparatus from among the plurality of storage apparatuses, with verification data stored in the control part. 11) The program further comprises instructions to carry out at least at regular intervals writing verification operations on each storage apparatus of the plurality of storage apparatuses, and to erase data stored in the control part for the relevant storage apparatus when the verification result in success. According to an aspect of the present invention, verification data comprises CRC data. A computer readable information recording medium in which the program described above is stored.

Although herein embodiment(s) are described based upon a so-called magnetic disk array apparatus configured to integratively handle respective storage areas of a plurality of magnetic disk apparatuses as a single logical volume, the present invention is not limited to a magnetic disk array apparatus, and the present invention can be implemented in any type of computer recordable/readable medium or media apparatus. Although herein embodiment(s) describe CRC data redundancy or mirroring to a control part memory of a computer recordable/readable apparatus, the present invention is not limited to such a configuration and CRC data redundancy or mirroring to any other form or type of memory or computer recordable/readable media that can communicatively connect and/or be incorporated with the storage apparatus can be provided.

According to an aspect of the present invention, an apparatus is provided comprising a plurality of integratively managed storage apparatuses; and a programmable or programmed device to control the apparatus according to a process comprising mirroring, to a memory, verification data written in a storage apparatus disk with user data at a time of writing the user data in the storage apparatus disk, and verifying read data from a storage apparatus disk based upon the verification data mirrored to the memory and/or the verification data written in the storage apparatus disk. According to an aspect of the invention, the process of the programmable device further comprises verifying data writing performance of a storage apparatus, and clearing corresponding verification data from the memory, if the verifying of the data writing performance of the storage apparatus completes properly. According to an aspect of the invention, the verifying the data writing performance of the storage apparatus comprises write patrolling, for example, to test writing head(s) of a storage apparatus. However, the present invention is not limited to write patrolling for determining data writing performance of a storage apparatus, and other data storage apparatus testing techniques can be used. According to an aspect of the present invention, the write patrolling is performed at a time interval, or according to a remaining storage area capacity in the memory, or both. According to an aspect of the invention, verification data can also be cleared from the memory prior to data storage apparatus testing, for example, at step 18 when determined that read data is proper.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus having a plurality of storage apparatuses, comprising:
 a controller that executes operations of:
   managing storage areas of the plurality of storage apparatuses by writing verification data for a block of data upon writing the block of data in a storage apparatus and storing a part of the verification data in a storage area of the controller,
   comparing the verification data obtained when reading the data from the storage apparatus, with the verification data part stored in the storage area of said controller,
   verifying data writing performance of the storage apparatus by a write patrol on the storage apparatus according to one of at a time interval, or a remaining capacity of the storage area of the controller that stores the verification data part, or both, and
   clearing corresponding verification data part from the storage area of the controller, if the verifying of the data writing performance of the storage apparatus completes properly.

2. The storage apparatus according to claim 1, wherein the verifying of the data writing performance is performed on a storage apparatus basis and the verification data part stored in the storage area of controller for a relevant storage apparatus is cleared when the writing verification operation is a success for the relevant storage apparatus.

3. A method of controlling a storage apparatus having a plurality of storage apparatuses, comprising:
 providing a controller for managing storage areas of the plurality of storage apparatus by writing verification data for a block of data upon writing the block of data in a storage apparatus,
 storing a part of the verification data in a storage area of the controller,
 comparing the verification data obtained when reading the data from the storage apparatus, with the verification data part stored in the storage area of said controller,
 verifying data writing performance of the storage apparatus by a write patrol on the storage apparatus according to one of at a time interval, or a remaining capacity of the storage area of the controller that stores the verification data part, or both, and
 clearing corresponding verification data part from the storage area of the controller, if the verifying of the data writing performance of the storage apparatus completes properly.

4. The apparatus according to any one of claims 1 or 3, wherein the time interval is about three seconds or lower.

5. The apparatus according to claim 4, wherein the verification data is cyclic redundancy code (CRC) data.

6. The apparatus according to claim 5, wherein a portion of the CRC data is stored as the verification data part.

7. A computer readable medium storing a program controlling a controller of a storage apparatus having a plurality of storage apparatuses, to execute operations comprising:
 managing storage areas of the plurality of storage apparatus;
 writing verification data for a block of data upon writing the block of data in a storage apparatus;
 storing a part of the verification data in a storage area of the controller;
 comparing the verification data obtained when reading the data from the storage apparatus, with the verification data part stored in the storage area of said controller,
 verifying data writing performance of the storage apparatus by a write patrol on the storage apparatus according to one of at a time interval, or a remaining capacity of the storage area of the controller that stores the verification data part, or both, and
 clearing corresponding verification data part from the storage area of the controller, if the verifying of the data writing performance of the storage apparatus completes properly.

8. An apparatus, comprising:
 a plurality of storage apparatuses; and
 a control device
  writing a block of data including verification data for the block of data, in a storage apparatus,
  mirroring, to a memory of the control device, a part of the verification data written in the storage apparatus at a time of writing the data in the storage apparatus,
  verifying read data from the storage apparatus based upon the mirrored verification data part in the memory and/or the verification data written in the storage apparatus,
  verifying data writing performance of the storage apparatus by a write patrol on the storage apparatus according to one of at a time interval, or a remaining capacity of the storage area of the controller that stores the verification data part, or both, and
  clearing corresponding verification data part from the memory of the control device, if the verifying of the data writing performance of the storage apparatus completes properly.

9. An apparatus in communication with a host apparatus, comprising:
 a plurality of storage apparatuses; and
 a control device
  writing a block of data including verification data for the block of data, in a storage apparatus,
  mirroring, to a memory of the control device, a part of the verification data written in the storage apparatus at a time of writing the data in the storage apparatus,
  reading the data, including the verification data corresponding to the read data, from the storage apparatus, in response to a read instruction from the host apparatus,
  reading, from the memory, the verification data part corresponding to the read data, if the verification data part corresponding to the read data exists in the memory,
  verifying the read data from the storage apparatus based upon the mirrored verification data part in the memory and/or the verification data written in the storage apparatus by:
   determining whether the verification data part read from the memory agrees with the verification data read from the storage apparatus disk, and/or
   determining whether a recalculated verification data based upon the read data from the storage apparatus agrees with the corresponding verification data read from the storage apparatus,
  verifying data writing performance of the storage apparatus by a write patrol on the storage apparatus according to one of at a time interval, or a remaining capacity of the storage area of the controller that stores the verification data part, or both, and
  clearing corresponding verification data part from the memory of the control device, if the verifying of the data writing performance of the storage apparatus completes properly.

10. The apparatus according to claim 9, wherein the mirroring comprises storing the verification data part to the memory of the control device according to a format including storing the verification data part and a corresponding relationship to a relevant storage apparatus by storing a number of the relevant storage apparatus in which the verification data is stored, and a relevant logical block address of the relevant storage apparatus that stores the verification data.

* * * * *